March 11, 1952 — R. MAYNE — 2,589,193
AIRFOIL, AND PARTICULARLY HELICOPTER BLADE
Filed Nov. 29, 1946 — 2 SHEETS—SHEET 1

Inventor
Robert Mayne

By
AHDedham Attorney

March 11, 1952     R. MAYNE     2,589,193
AIRFOIL, AND PARTICULARLY HELICOPTER BLADE
Filed Nov. 29, 1946     2 SHEETS—SHEET 2

Inventor
Robert Mayne

By
H. H. Oldham
Attorney

Patented Mar. 11, 1952

2,589,193

UNITED STATES PATENT OFFICE 2,589,193

AIRFOIL, AND PARTICULARLY HELICOPTER BLADE

Robert Mayne, Akron, Ohio, assignor to Goodyear Aircraft Corporation, Akron, Ohio, a corporation of Delaware Application November 29, 1946, Serial No. 713,157

8 Claims. (Cl. 244—134)

1

This invention relates to airfoils, and, more particularly, to helicopter blades or other rotary airfoils, and is concerned specifically with the construction of such airfoils.

Heretofore, airfoils of various types have been proposed and used, in both the stationary and rotary airfoil fields. Strength, weight, balance, and efficiency problems arise, and it is well recognized that many improvements can be made in existing structures. But particularly in rotary airfoil the need for improvement has been recognized. Present rotary airfoils are largely of the type employing wood and fabric components, but it is believed that these are responsible for much of the vibration and poor performance of present day helicopters. Accurate mass, aerodynamic balance, and precision of contour are not possible with atmospherically unstable materials. In addition, abrasion and aerodynamic loads and the high operating velocities encountered in a helicopter blade produce serious wear and distortion of the fabric covering. In rotary airfoils the bending and centrifugal stresses are different and more complicated than in either fixed wing airfoils or propellers. Cyclic pitch control occasioned by the rotary airfoil moving first into the wind and thereafter with the wind when the helicopter is in forward flight complicate rotary airfoil design.

Without dwelling further upon the complications of airfoil and specifically rotary airfoil design, it is the general object of the application to avoid and overcome the difficulties of and objections to known airfoil designs by the provision of a relatively stable, and vibration-free airfoil having relatively high safety factors and relatively low weight.

Another object of the invention is to provide a rotary airfoil of high performance characteristics including accurate mass, aerodynamic balance and precision of contour, and capable of being used over long periods and under a wide variety of temperatures with substantially no maintenance costs.

Another object of the invention is the provision of an airfoil having a considerable portion thereof made of stainless steel and including features of monocoque construction.

Another object of the invention is to provide a rotary airfoil with built in deicing means.

Another object of the invention is the provision of an airfoil including laminated skins covering at least a part of the airfoil, and with means for joining the laminated skins together at the trailing edge of the airfoil.

Another object of the invention is to provide an airfoil, and particularly a rotary airfoil having substantially the forward third of the airfoil formed from a unitary integral piece of sheet metal of monocoque construction.

The foregoing objects of the invention, and

2 other objects which will become apparent as the description proceeds, are achieved by the provision of an airfoil having a main spar, preferably of stainless steel, a unitary, high strength metal sheet, also ordinarily of stainless steel, formed to provide a monocoque structure for substantially the forward third of the airfoil, the rear edges of the metal sheet being secured to the spar, ribs extending rearwardly of the spar, and a plastic laminate having thin surface coverings of metal sheet, preferably stainless steel, secured to the top and bottom of the ribs and to the spar and acting as the skin for the remainder of the airfoil. The trailing edge of the airfoil preferably includes a wedge shaped, fabric reenforced plastic to which the trailing edges of the skins are adhesively secured. Preferably the monocoque structure of the leading edge of the airfoil provides a chamber for the passage of hot gases along the leading edge of the airfoil to prevent ice formation thereon, with the hot gases entering at the inner transverse end of the airfoil and exhausted through an opening in the tip of the airfoil.

For a better understanding of the invention reference should be had to the accompanying drawings, wherein.

Figure 1:
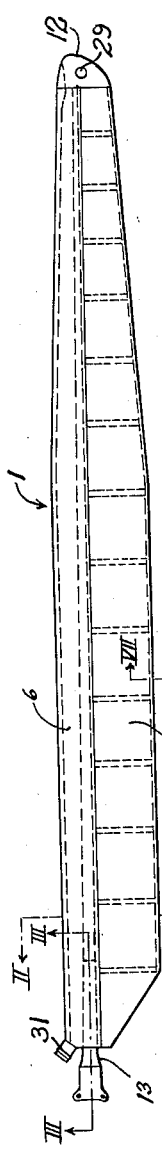
Fig. 1 is a plan view of a helicopter blade incorporating the principles of the invention.

Although the features of the invention may be employed in the construction of airfoils of various types, the invention is primarily concerned with rotary airfoils, and specifically helicopter blades, and accordingly, the invention has been so illustrated and will be so described.

Referring to the drawings, the numeral 1 indicates generally a helicopter blade having a main or forward spar 2, an aft spar 3, rearwardly extending, laterally spaced ribs 4, a baffle plate 5, a monocoque forward skin 6, a reenforcement 7 for the leading edge of the forward skin 6, a lead counter-weight 8, a heat exchanger fin 8a held by the counter-weight, aft skins 9 and 10, a trailing edge filler strip 11, a tip 12, and a spar root 13.

Figure 4:
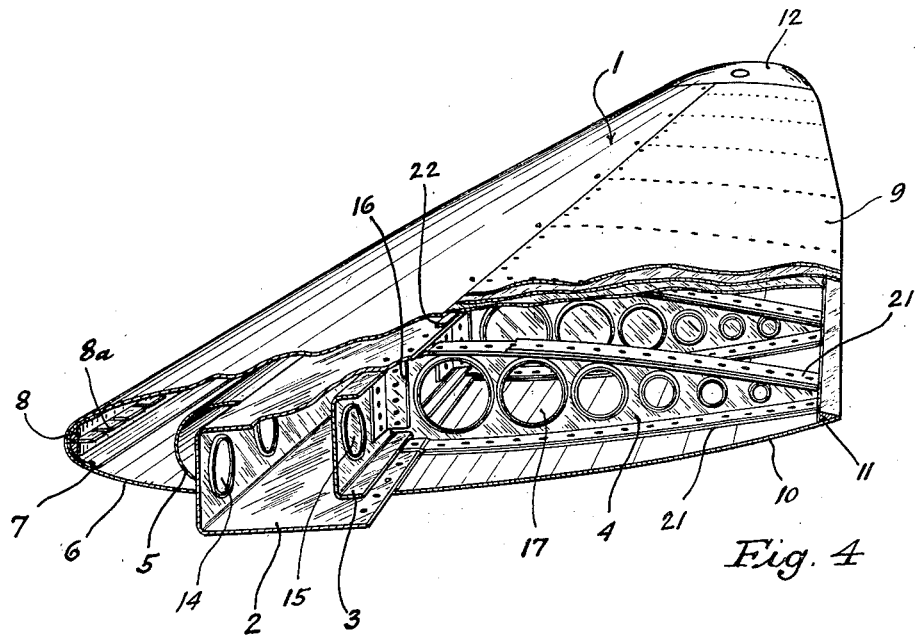
Fig. 4 is a perspective view, partly broken away, of the helicopter blade incorporating the features of the invention.
Figure 5:
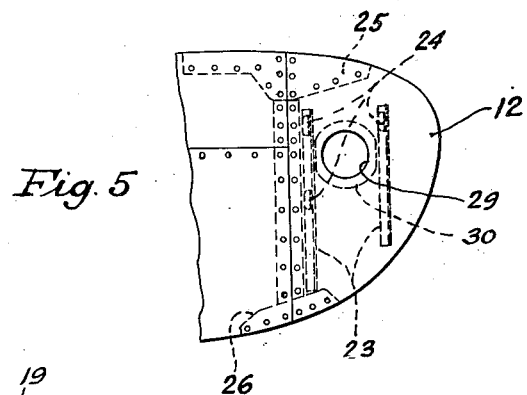
Fig. 5 is a plan view of the airfoil tip.

For purposes of strength, and for other reasons which will be developed as the description proceeds, the main or forward spar 2 is made of stainless steel, and is of U-shape in cross-section, being provided with lightening holes 14 along its forward vertical portion, in the manner best seen in Fig. 4. The spar 2 is positioned on its side with the legs of the U extending rearwardly, and the aft spar 3, also preferably made of stainless steel, and having lightening holes 15 therein, is received between the legs of the forward spar and is connected thereto. Baffle plate 5 is made of relatively light stainless steel, for example, .003 inch, and is secured over the front of the forward spar in the manner shown in Fig. 4. Of course, the forward spar is made of a gauge of metal adapted to take the computed test loads with the required margin of safety, a typical gauge being in the neighborhood of .030 inch. The aft spar 3 may be of the same gauge as the main spar.

The forward skin 6 which is, as already noted, of monocoque structure having no internal support, is made in a single unitary piece from stainless steel sheet, all in the manner described and claimed in co-pending application, Serial No. 712,338, filed November 26, 1946, and entitled "Method of Making Airfoils, Helicopter Blades, Leading Edges, and the Like," which application matured into Patent No. 2,490,976 on December 13, 1949.

The gauge of the stainless steel sheet forming the forward skin 6 is substantially the same as that employed in the main or forward spar 2, being in the neighborhood of .030 inch.

One important advantage in employing stainless steel for both the forward spar 2 and the forward skin 6 is that these parts can be readily and effectively spot welded together. Spot welding of stainless steel is readily effected, it being only necessary to watch out that too much electrode pressure is not employed so as to avoid excessive dimpling of the sheets in the region of the spot weld, but with the spot welds possessing high strength, and good fatigue and corrosion resistance characteristics. Similarly, the aft spar 3 is preferably spot welded in position, as can the baffle plate 5. Also, the reenforcing member 7 for the leading edge or nose of the airfoil may be of stainless steel and can be spot welded in position. Prior to securing the reenforcing member 7 into position, the lead counter-weight 8 can be melted into the reenforcing member, with the counter-weight 8 carrying the heat transfer fin 8a. In order to avoid unduly raising the temperature of the reenforcing strip 7, the counter-weight 8 is preferably made from a lead alloy having a relatively low melting point.

It has been found advisable, in order to effect the best possible heat transfer relation between the fin 8a, the counter-weight 8, and the leading edge of the forward skin 6, to secure the reenforcing member 7 to the inside of the leading edge of the forward skin by means other than spot welding. Specifically, a plastic heat conducting material, such as a brazing metal or solder, again flowable at a relatively low temperature, is preferably employed.

A few dimpled rivets at rather widely separated longitudinally spaced points may be used to assist in fastening the forward skin to the forward spar and the aft spar, in the manner best seen in Fig. 4.

The ribs 4 are preferably made of aluminum or aluminum alloy, and, as best seen in Fig. 4, are adapted to be secured by angle brackets 16 to the aft spar 3, at laterally spaced points along the aft spar, with the ribs 4 extending rearwardly of the airfoil. Ribs 4 are also connected to the legs of the forward spar, in the manner shown. The ribs are provided with lightening holes 17, and with top and bottom flanges to which the aft skins 9 and 10 are adapted to be secured.

In order to prevent undesired flow of air longitudinally of the airfoil under the action of centrifugal force when the airfoil is being rotated in use, the lightening holes 15 of the aft spar are closed by means of flexible air tight membranes which are adhesively secured over the lightening holes, and at spaced ribs 4, for example, every other rib, the lightening holes 17 are closed by similar membranes. Or at these spaced points ribs 4 may be used which do not include lightening holes. This prevents sub-atmospheric or super-atmospheric pressures in undesirable amounts from building up anywhere along the aft portion of the airfoil during the rotation of the airfoil in use. The pressure differential between the inside and the outside of the aft skins should never exceed a maximum of approximately one-quarter pound per square inch, and this is achieved in the present blade. Without the sectionalization described, and with the air tending to flow out to the blade tip under centrifugal action, pressure differentials of up to two pounds per square inch or more may be obtained which is highly undesirable and which may effect changes in contour of the aft section of the airfoil. Each section of the airfoil is vented to the atmosphere, as will be understood. The forward section of the airfoil does not have to be sectionalized because of the very considerable strength of the forward skin and forward spar.

Any moisture in the blade will be thrown by centrifugal force to the lower corner of the rib and aft spar, due to the lag angle of the blade, and a small hole is provided at that point in each rib so that the water will ultimately reach the tip of the airfoil from which it will drain by the provision of a small hole suitably positioned in the tip.

Figure 6:
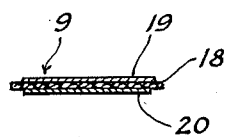
Fig. 6 is an enlarged view of the laminated skin on the airfoil, taken substantially on line VI—VI of Fig. 2.

The aft skins 9 and 10 are made from a stainless steel and plastic laminate. This is because stainless steel sheet having a thickness of necessary strength, is too heavy. Aluminum or aluminum alloys if employed as aft skins will have a different coefficient of expansion than the stainless steel spar and forward skin with the result that temperature changes would warp or distort the blade. The invention employs, as best seen in Fig. 6, a laminate structure having a center or filler 18 of fabric reenforced thermo-setting plastic. To the filler are secured on top and bottom very thin sheets 19 and 20 of stainless steel. Preferably the stainless steel sheets 19 and 20 are secured to the filler plastic 18 by means of a thermo-setting cement, such as manufactured under the trade-marks "Pliobond" or "Cycleweld." Stainless steel sheets 19 and 20 are, as noted, ordinarily relatively thin, being in the neighborhood of .0015 inch, with the plastic filler having a thickness of about .007, the total thickness of the laminate including the adhesive being in the neighborhood of .018 inch. The result is a high strength, but relatively low weight laminate skin which is capable of absorbing well within its mechanical strength, with usual safety factors, any forces to which the aft skins are subjected.

The aft skins 9 and 10 are riveted to the edges of the legs of the forward spar 2, and to the flanges of the ribs 4. Preferably a cushioning strip 21 of aluminum or aluminum alloy is secured by an adhesive, such as the thermo-setting cement heretofore described, to the inner surface of each aft skin 9 and 10 adjacent the ribs 4. The strengthening strip 21 serves to provide extra strength for the laminate adjacent the ribs so that the skins 9 and 10 can be riveted to the ribs and to the edges of the forward spar 2. All of the rivets used are countersunk into the laminate, and the stainless steel sheets 19 and 20 used in the laminate are preferably half hard so as to facilitate dimpling thereof without cracking. In order to strengthen the forward edge of the skins 9 and 19, filler strips 22 of aluminum or aluminum alloy are adhesively secured thereto. Moreover, the filler strips 22 are of a thickness to build up the thickness of the laminate to a dimension equal to the gauge of the forward skin 6 so that the surface of the airfoil adjacent the line of butt engagement of the forward skin 6 and the aft skins 9 and 10 will be flat and smooth.

Figure 7:
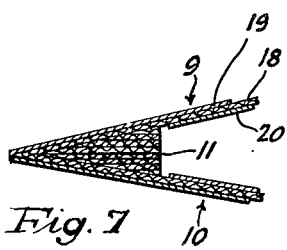
Fig. 7 is an enlarged cross-sectional view taken substantially on line VII—VII of Fig. 1, and illustrating the details of securing the trailing edges of the airfoil together.

The trailing edges of the aft skins 9 and 10 are secured to the wedge shaped trailing edge strip 11 by an adhesive cement. This is conveniently achieved, in the manners best seen in Figs. 4 and 7, by making the trailing edge strip 11 from a fabric reenforced thermo-setting plastic, and with the stainless steel sheet 20 on the inside of each of the skin laminates 9 and 10 terminating short of the wedge shaped strip 11. Thus, the plastic filler 18 of each laminate is positioned adjacent the wedge shaped strip 11, and an adhesive cement, preferably one which is adapted to set without heat, for example that sold under the trade name "Resin-X," is applied to the several parts which are clamped together until the cement dries. Rivets are not employed at the trailing edge because of the difficult angle and the small space in which they must be applied, and it has been found that the wedge shaped trailing edge strip 11 when assembled as described performs very satisfactorily.

Coming now to the tip 12 for the airfoil, this is conveniently made up from two half shells of aluminum or aluminum alloy material which is formed to appropriate contour, the two half shells being seam welded around their edges to join them together to form the tip. The tip 12 preferably has forward to aft strengthening angles 23 secured to the inside of the top and bottom of the tip, and pillar brackets 24 extending between the top and bottom surface of the tip. A steel counter-weight 25 secured to the tip extends into the end of the leading edge of the forward skin 6 and is secured thereto by blind rivets or other fastening means to secure the wing tip in position. A gusset plate 26 secured to the aft portion of the tip 12 functions to additionally anchor the tip in place. The tip is formed with a hole 29, reenforced by an inside flange 30, the hole functioning as the discharge opening for hot gases entering through a nipple 31 at the inner end of the airfoil and passed along inside the leading edge thereof.

Figure 2:
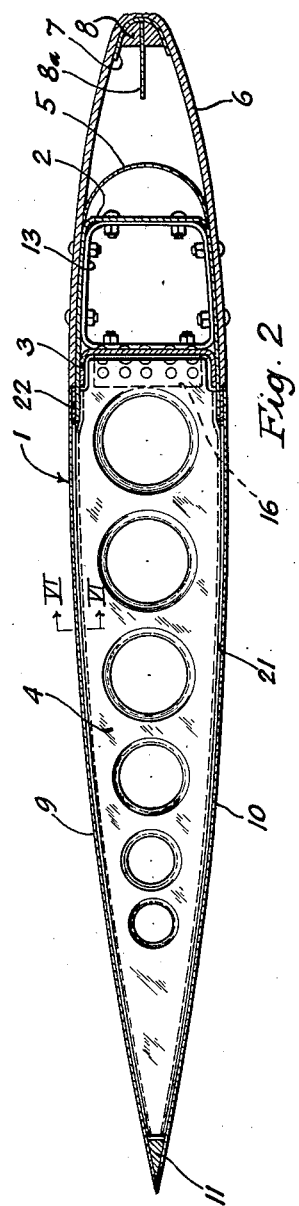
Fig. 2 is an enlarged vertical cross-sectional view taken substantially on line II—II of Fig. 1.
Figure 3:
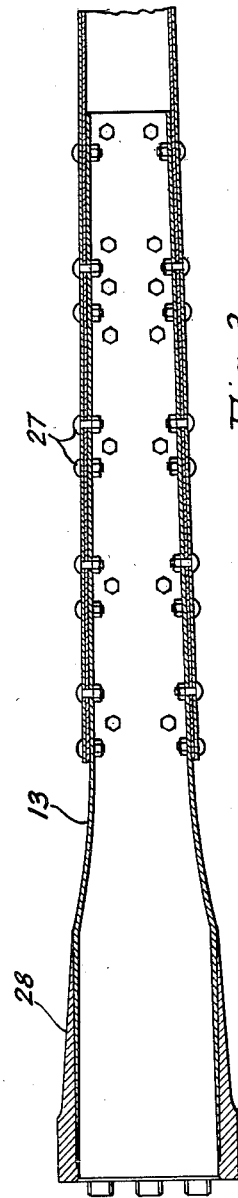
Fig. 3 is an enlarged vertical longitudinal sectional view taken substantially on line III—III of Fig. 1 and illustrating the manner of connecting the root spar to the blade.

As best seen in Figs. 2 and 3, a spar root 13 extends into the forward spar 2. The spar root 13 is of a cross-sectional contour so that it will slide snugly, and in wedging relation inside of the forward spar 2 and the aft spar 3. Bolts 27 fasten the airfoil to the spar root in the manner best seen in Fig. 3. A fitting 28 is welded to the spar root 13, with the fitting being adapted to be secured in known manner to the rotary mechanism for the helicopter blade. The manner of making the spar root 13 and the fitting 28 form the subject matter of a co-pending patent application, Serial No. 718,696, filed December 27, 1946, and entitled "Method of Making Spar Roots for Helicopter Blades and the Like," which application matured into Patent No. 2,485,534 on October 18, 1949.

From the foregoing it will be recognized that the various objects of the invention have been achieved by the provision of a relatively simple, high strength airfoil having many noteworthy features, and particularly adapted for use as a helicopter blade. A novel monocoque structure for the forward section of the airfoil is provided, and the aft section of the airfoil is characterized by the use of a stainless steel laminate having high strength and low weight. The airfoil has a built-in deicing chamber, centrifugally induced flow of trapped air in the blade is eliminated, and the airfoil is adapted to retain its shape and operating characteristics even when subjected to the complex and changing forces encountered in rotary airfoils, particularly helicopter blade operation.

While in accordance with the patent statutes one best known embodiment of the invention has been illustrated and described in detail, it is to be particularly understood that the invention is not to be limited thereto or thereby, the inventive scope being defined in the appended claims.

What is claimed is:

1. The combination in an airfoil of a main spar of stainless steel, a unitary, high strength stainless steel metal sheet formed to provide a monocoque structure for substantially the forward third of the airfoil and secured to the spar, ribs extending rearwardly of the spar, and a plastic laminate having a very thin surface covering of stainless steel secured to the ribs and to the spar and acting as the skin for the remainder of the airfoil, the total thickness of said laminate being smaller than the thickness of said unitary metal sheet.

2. The combination in an airfoil of a main spar, a unitary metal sheet formed to provide a monocoque structure for substantially the forward third of the airfoil and secured to the spar, ribs extending rearwardly of the spar, and a plastic laminate having a thin surface covering of metal sheet secured to the ribs and to the spar and acting as the skin for the remainder of the airfoil, the total thickness of said laminate being within the thickness of said unitary metal sheet.

3. In combination in an airfoil, a main spar positioned back from the leading edge about one third of the chord, a single piece of stainless steel sheet bent to form a monocoque substantially forward third of the airfoil, the edges of the sheet being secured to the spar, metal surfaced plastic laminates secured to the spar and extending rearwardly thereof to form the skin of the remainder of the airfoil, and internal bracing for the laminates, the total thickness of each of said laminates being within the thickness of said forward single sheet.

4. A helicopter rotor blade adapted to be heated with gases for deicing including a forward spar having substantially a U-shape in cross-section, an aft spar also having a U-shape in cross-section being nested in the forward spar, the legs of both spars extending rearwardly and the spar webs being spaced from each other to form a box-like structure, a spar root closely fitting into and being secured to said structure for attachment to a blade operating mechanism, an elongated sheet or plate curved across its width to form a leading edge skin and having its opposite edges overlapping the respective legs of the forward spar so as to substantially cover said spar, a baffle plate welded longitudinally to the front and the full length of the forward spar and forming together with the leading edge skin a hot gas duct, a reinforcing plate running along the inside of and being spotwelded to the leading edge skin, a central longitudinal heat transfer fin united with the reinforcing plate, a counterweight made of material having a low melting point being cast into said reinforcing plate, ribs connected to and extending rearwardly of the aft spar and connected also to the legs of the forward spar, bottom and top skins extending from the leading edge skin over the ribs to the trailing edge, each of the bottom and top skins comprising a laminate having surfaces of thin stainless steel and a fibre-reinforced plastic filler of a total thickness less than that of the leading edge skin, a reinforced plastic trailing edge strip of wedge-shape in cross-section to which the laminated skins are adhesively secured in contact with their plastic filler, an inlet for carrying hot gases to said duct at the root end of the blade, and a blade tip provided with an opening communicating with said hot gas duct for exhausting heating gases carried therein.

5. A helicopter rotor blade including a forward spar having substantially a U-shape in cross-section, an aft spar also having a U-shape in cross-section being nested in the forward spar, the legs of both spar cross-sections extending rearwardly of the airfoil and the vertical webs of the spars being spaced from each other to form a box-like structure, an elongated sheet or plate curved across its width to form a leading edge skin and having its opposite edges overlapping the respective legs of the forward spar so as to substantially cover said spar, ribs connected to and extending rearwardly of the aft spar and connected also to the legs of the forward spar, bottom and top skins extending from the leading edge skin over the ribs to the trailing edge, each of the bottom and top skins comprising a laminate having surfaces of thin stainless steel and a fibre-reinforced plastic filler, said laminate being of a total thickness not greater than the thickness of the leading edge skin, and a reinforced plastic trailing edge strip of wedge-shape in cross-section to which the laminated skins are adhesively secured in contact with their plastic filler.

6. A helicopter rotor blade including a forward spar having substantially a U-shape in cross-section, an aft spar also having a U-shape in cross-section being nested in the forward spar, the legs of both spar cross-sections extending rearwardly of the airfoil and the vertical webs of the spars being spaced from each other to form a box-like structure, an elongated sheet or plate curved across its width to form a leading edge skin and having its opposite edges overlapping the respective legs of the forward spar so as to substantially cover said spar, ribs connected to and extending rearwardly of the aft spar and connected also to the legs of the forward spar, and bottom and top skins extending from the leading edge skin over the ribs to the trailing edge, each of the bottom and top skins comprising a laminate having surfaces of thin stainless steel and a fibre-reinforced plastic filler, said laminate being of a total thickness not greater than the thickness of the leading edge skin.

7. A helicopter rotor blade including a forward spar having substantially a U-shape in cross-section, an aft spar also having a U-shape in cross-section being nested in the forward spar, the legs of both spar cross-sections extending rearwardly of the airfoil with the legs of the forward spar extending beyond the rear edge of the legs of the aft spar and the vertical webs of the spars being spaced from each other to form a box-like structure, an elongated sheet or plate curved across its width to form a leading edge skin and having its opposite edges overlapping the respective legs of the forward spar so as to substantially cover said spar, ribs connected to and extending rearwardly of the aft spar and connected also to the legs of the forward spar, and laminated bottom and top skins extending from the rear edge of the leading edge skin over the ribs to the trailing edge and having stainless steel faces enclosing a reinforced core.

8. The combination in a helicopter rotor blade of a leading edge skin consisting of a single stainless steel sheet, skin members extending rearwardly from said leading edge skin and forming therewith the surface of the airfoil, said skin members being formed of stainless steel faces including a fabric reinforced plastic core, a wedge-shaped fabric-reinforced plastic laminate positioned inside the trailing edge of the airfoil substantially the full length thereof, and self-curing adhesive securing the trailing edges of the skin members to the wedge-shaped plastic laminate, the inside steel of said skin members being shorter than their outer sheet to make the wedge-shaped laminate contact the plastic core of said skin members.

ROBERT MAYNE.

REFERENCES CITED

The following references are of record in the file of this patent:

UNITED STATES PATENTS

| Number | Name | Date |
|---|---|---|
| 1,496,304 | Dornier | June 3, 1924 |
| 1,507,143 | Towssaint | Sept. 2, 1924 |
| 1,523,106 | Dornier | Jan. 13, 1925 |
| 1,682,202 | Vaughn | Aug. 28, 1928 |
| 1,864,438 | Janson | June 21, 1932 |
| 1,874,685 | Wright | Aug. 30, 1932 |
| 1,942,674 | Whitsett | Jan. 9, 1934 |
| 1,976,480 | Carleton et al. | Oct. 9, 1934 |
| 1,988,085 | Orlando | Jan. 15, 1935 |
| 2,164,678 | Bennett | July 4, 1939 |
| 2,189,785 | Fahrney | Feb. 13, 1940 |
| 2,341,997 | Law et al. | Feb. 15, 1944 |
| 2,361,438 | Turner | Oct. 31, 1944 |
| 2,394,513 | Chappedelaine | Feb. 5, 1946 |
| 2,412,908 | Platt et. al. | Dec. 17, 1946 |
| 2,460,351 | Hoffman et al. | Feb. 1, 1949 |
| 2,469,480 | Sikorsky | May 10, 1949 |

FOREIGN PATENTS

| Number | Country | Date |
|---|---|---|
| 417,139 | Great Britain | Sept. 28, 1934 |
| 506,444 | Great Britain | May 30, 1939 |
| 807,110 | France | Oct. 12, 1936 |